United States Patent [19]

Marandet

[11] 4,352,405
[45] Oct. 5, 1982

[54] CONTROL DEVICES FOR SPEED REDUCERS

[75] Inventor: André Marandet, Saint-Gratien, France

[73] Assignee: Labavia - S.G.E., Paris, France

[21] Appl. No.: 135,287

[22] Filed: Mar. 31, 1980

[30] Foreign Application Priority Data

Apr. 10, 1979 [FR] France .................. 79 09098

[51] Int. Cl.³ .................................... B60T 8/014
[52] U.S. Cl. .............................. 180/282; 303/24 A
[58] Field of Search ............... 180/282, 285, 271; 303/97, 99, 24 A; 188/267

[56] References Cited

U.S. PATENT DOCUMENTS 2,052,205  8/1936  Baughman ....................... 303/97
2,474,598  6/1949  Smies ............................. 180/285
4,164,987  8/1979  Lagarde .......................... 180/271

Primary Examiner—Joseph F. Peters, Jr.
Assistant Examiner—M. J. Hill
Attorney, Agent, or Firm—Robert E. Burns; Emmanuel J. Lobato; Bruce L. Adams

[57] ABSTRACT

For automatically neutralizing the energization of a speed reducer adapted to brake an axle of a heavy vehicle, when the deceleration of this latter exceeds a predetermined threshold, the movements are used of a mass, such as a drop of mercury, adapted to ascend under the effect of its inertia a ramp inclined with respect to the axis of the vehicle by an angle A whose tangent is equal to $(m/M)$ tg $\alpha$, M being the total mass of the vehicle, m the mass applied to the braked axle and tg $\alpha$ the coefficient of adhesion between the wheels of this axle and the ground.

6 Claims, 3 Drawing Figures

U.S. Patent  Oct. 5, 1982  4,352,405
Fig. 1.
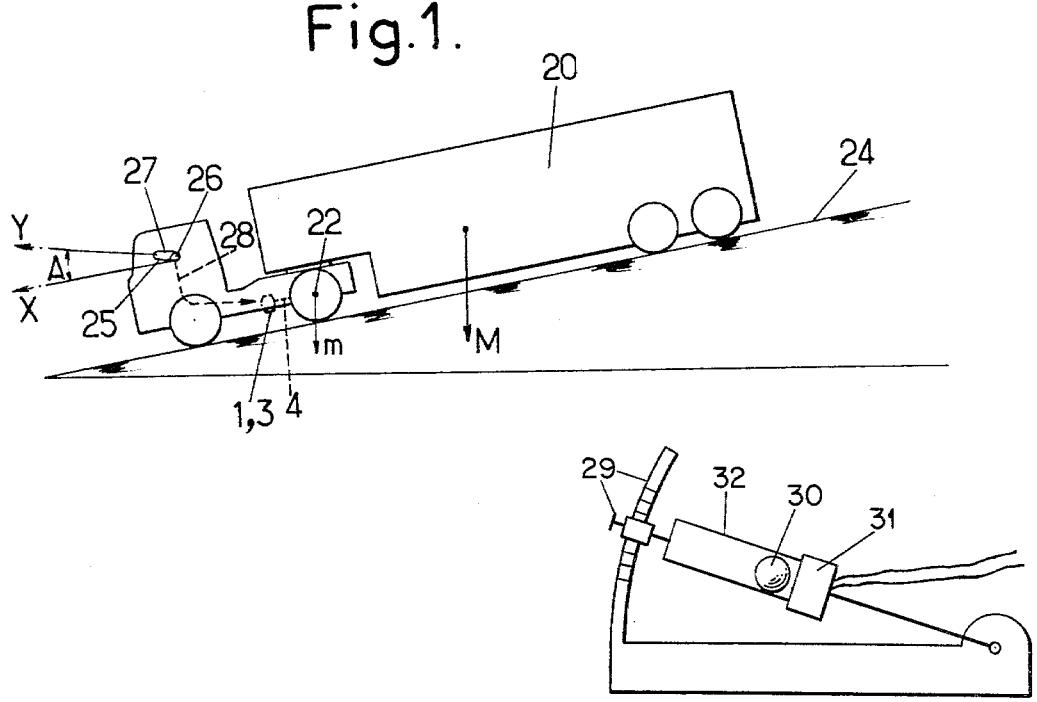
Fig. 3.
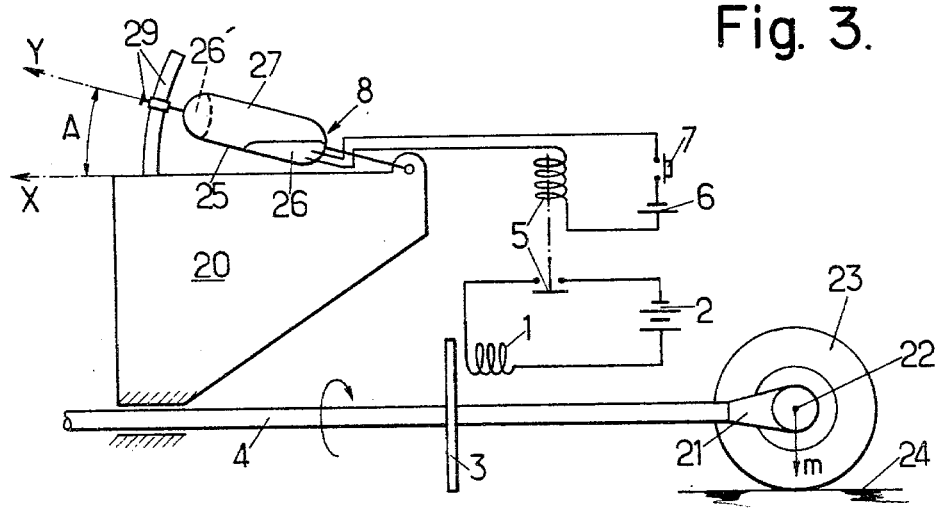
Fig. 2.

CONTROL DEVICES FOR SPEED REDUCERS

The invention relates to devices for controlling speed reducers or retarders adapted to brake axles of heavy vehicles and more especially those, of these control devices, which comprise means for automatically neutralizing at least partially the speed reducer when the deceleration of the empty or lightly loaded vehicle exceeds a predetermined threshold beyond which the wheels of the braked axle risk skidding.

The invention applies more particularly to the case where the above neutralization means are arranged so as to use the inertial movements of a mass carried by the vehicle and responsive to the decelerations thereof, such as taught by U.S. Pat. No. 4,164,987 belong to the assignee of the present application.

It has as an aim to propose for these neutralization means an embodiment which is easy to manufacture and to use and which takes automatically into account at one and the same time at any moment, not only the deceleration of the vehicle at that moment, but also the slope of the roadway on which the vehicle happens to be at said moment.

It is essentially characterized in that the mass whose inertial movements are used is arranged and mounted so as to be able to move along a ramp whose median line, rising towards the front of the vehicle, is disposed in a longitudinal vertical plane of this vehicle and is inclined with respect to the longitudinal axis thereof by an acute angle A substantially such that M tg A = m tg $\alpha$, in which formula M is the total unladen mass of the vehicle, tg A is the tangent of angle A, m the unladen mass applied to the braked axle of the speed reducer and tg $\alpha$ the coefficient of adhesion between the wheels of said axle and the ground.

In preferred embodiments, recourse is had furthermore to one and/or the other of the following arrangements:

- angle A is between 5° and 15°, preferably between 5° and 10°,
- means are provided for selectively adjusting angle A depending in particular on the load of the vehicle and/or on the condition of the ground,
- the mass is formed by a drop of mercury enclosed in an inclined tube which forms the ramp,
- the mass is formed by a ball.

The invention comprises, apart from these principal arrangements, certain other arrangements which are preferably used at the same time and which will be more explicitly discussed hereafter.

The invention will be better understood from the following description of preferred embodiments thereof. The description refers to the accompanying figures in which:

FIG. 1 shows very schematically a heavy vehicle equipped with a speed reducer and a control device in accordance with the invention.

FIG. 2 shows, also schematically but with more details, this speed reducer and this control device.

FIG. 3 shows another embodiment of the deceleration sensing device used in the present invention.

In the illustrated embodiment, the heavy vehicle—designated here by the reference 20 in the drawings—comprises on the one hand friction brakes operable by the driver of this vehicle and, on the other hand, an electric eddy current speed reducer also operable by this driver, the speed reducer in question is schematized by the assembly of a disc 3 made from a magnetic material and a winding 1, the electric current supply for the winding 1 from a battery 2 being capable of generating eddy currents in this disc 3, disc 3 is connected in rotation to the drive shaft 4 of the vehicle, particularly to a section of this shaft situated between the gearbox and the live axle of this vehicle, the supply for this winding 1 from battery 2 is controlled by a relay contactor 5, itself energizable by a DC source 6 when a switch 7 is closed which forms the control member for the speed reducer operable by the driver of the vehicle, and means are provided for automatically neutralizing the effect of this closure, i.e. the control of the speed reducer, when the vehicle is travelling empty or lightly loaded and when its deceleration exceeds a predetermined threshold D corresponding to a danger of skidding.

These neutralization means comprise a deceleration sensing device responsive to the inertia of a solid or liquid inertial mass mounted on the vehicle and adapted to establish or abolish an electrical contact according to its position.

In the embodiments envisaged here for this deceleration sensing device responsive to inertia, there is provided on vehicle 20 a ramp 25 whose mean line, rising towards the front of the vehicle, is disposed in a longitudinal vertical plane of this vehicle and is inclined with respect to the longitudinal axis thereof by an acute angle A and the mass movable by inertia is arranged and mounted so that it may ascend said ramp during a sufficient deceleration of the vehicle.

Furthermore, if we consider:

the total unladen mass M of the vehicle 20, the unladen mass m applied to the single axle 22 braked by the speed reducer 1, 3, and the coefficient of adhesion tg $\alpha$ of the wheels 23 of this axle 22 on ground 24, a value is given to angle A such that its tangent is substantially equal to (m/M)tg $\alpha$.

The applicant has discovered that, under these conditions, the mass movable by inertia begins to ascent said ramp as soon as the deceleration exceeds the predetermined threshold D, taking into account the slope of the roadway on which the vehicle is travelling, and then only comes back down to the base of this ramp after subsequent reduction of the deceleration below a resetting value D-d slightly less than the threshold D.

In the embodiments to which the invention preferably applied, i.e. for heavy vehicles of the articulated vehicles or heavy lorry type, the ratio m/M is generally less than ⅔, being rather of the order of ⅓.

Thus, for the articulated unit formed by a tractor and trailer braked by the speed reducer on the rear axle of the tractor and with an overall weight of about 38 t loaded and 12 t empty, the ratio m/M is the order of 0.33 when loaded and 0.27 when empty.

These figures are respectively 0.66 and 0.40 for a lorry with a total weight of about 20 t under load and 7 t empty and braked by the speed reducer on a single rear axle.

Therefore, if we adopt for the coefficient of adhesion tg $\alpha$ that of 0.4 relative to the contact between a heavy lorry tire and a damp paved road, the tangent which results therefrom for angle A is generally less than 0.27, being of the order of 0.13: in other words angle A is relatively small, being generally less than 15° and rather of the order of 7° to 8°.

In the embodiment shown schematically in the drawing, the mass movable by inertia is a drop of mercury 26 enclosed in a small rectilinear tube 27 of which the lower lateral portion forms ramp 25.

This tube 27 is then mounted on the vehicle so that its axis Y is inclined by an angle A with respect to the longitudinal axis X of this vehicle, which is normally horizontal, this angle A being acute if we consider the axis Y of the tube as orientated upwards and the axis X of the vehicle as orientated forwards.

The movements of the drop of mercury 26 are used to open an electric switch 8 mounted in series with the switch 7, as shown schematically in FIG. 2, or with switch 5, this case not being shown.

This electric switch 8 comprises two bits of conducting wire penetrating into tube 27 and connected electrically to each other by drop of mercury 26 as long as this latter is at the base of the tube, i.e. as long as the vehicle remains at rest or more generally as long as its deceleration remains less than a predetermined threshold D corresponding to the risk of skidding of wheels 23.

Calculation shows that, as soon as the deceleration of the vehicle exceeds the threshold D, drop 26 ascends the ramp 25 and moves away from the two bits of wire forming switch 8, which are then automatically separated from each other, which opens said switch: the drop of mercury then occupies the upper part of the tube, as shown at 26' in FIG. 2.

This opening of switch 8 results in the electrical supply to relay 5 being cut off immediately, and so that to winding 1 of the speed reducer (this result being shown schematically by arrow 28 in FIG. 1), which avoids risks of skidding of wheels 23.

As soon as the deceleration is again reduced below a resetting threshold D-d slightly less than D, the drop of mercury 26 goes back down to its initial position at the base of tube 27, which again closes switch 8 which re-establishes the electrical supply to the speed reducer if this has not been cut off meantime by opening of switch 7 under the control of the driver of the vehicle.

Of course, any desirable means may be provided for selectively adjusting the value of angle A, then for locking it in its thus adjusted position.

In fact, it may be desirable to modify this angle A even before starting up the vehicle to take into account a modification occurring since its previous movement concerning one of the parameters m, M and tg α, i.e. concerning the total load of the vehicle, the load applied to the braked axle, the condition of the ground and/or the wear of the tires of the vehicle.

These adjusting and locking means comprise preferably a single screwing means and have been shown schematically by a screw sextant 29 in FIG. 2.

The drop of mercury 26 could be replaced by another small volume of a conducting liquid or more generally by any other mobile mass, movable along a ramp 25 with negligible friction, whose movements may be easily used to open or close an electric switch: in one particularly advantageous embodiment, this mass is formed by a ball.

An embodiment of the deceleration device using a ball rather than a conducting liquid is shown in FIG. 3. A ball 30 is disposed within a tube 32 and normally rests on the magnetic proximity detector 31. Upon deceleration the ball 30 moves within the tube 32 away from the proximity detector and the deceleration condition is detected.

It was assumed above, for the sake of simplification, that the speed reducer comprised a single inductor winding 1.

In practice this winding is formed from a plurality of elementary windings adapted to be supplied successively under the control of a switching member, this member then having a plurality of a control positions or successive stable "stages": it is usual in particular to distribute said elementary windings in four pairs and to control them by means of a five-position switching member. This switching member would function as the switch 7.

In this case, it is advantageous for the opening of switch 8 to effect only the last stage or the last two stages, corresponding to maximum energization of the speed reducer and so to the maximum braking torque, the risk of skidding being considered as negligible for the stages corresponding to weaker energizations.

Two switches of the type of switch 8 above, controlled by mobile masses and adjusted to two distinct angles A, i.e. operable for two distinct thresholds of deceleration of the vehicle, may even be provided and mounted so as to neutralize respectively the two last stages of the speed reducer, only the last stage being put out of action as soon as the deceleration of the vehicle exceeds a first threshold $D_1$ and the two last stages being put out of action when the deceleration of the vehicle exceeds a second threshold $D_2$ greater than $D_1$.

There may also be combined with one or other of the above types of control time delay means for deferring by a predetermined delay the operation of one of the speed reducing stages after it has been put out of action by a ramp sensing device of the above-indicated type: such a predetermined delay may be relatively long, being for example of the order of half a second.

It is apparent that within the scope of the invention modifications and different arrangements can be made other than are here disclosed. The present disclosure is merely illustrative with the invention comprehending all variations thereof.

I claim:

1. A control device for a speed reducer adapted to brake an axle of a heavy vehicle, comprising means for automatically neutralizing at least partially the speed reducer when the deceleration of the empty or lightly loaded vehicle exceeds a predetermined threshold beyond which the wheels of said axle risk skidding, these neutralization means being arranged so as to use the inertial movements of a mass carried by the vehicle and responsive to the deceleration of this latter, wherein said mass is arranged and mounted so as to be able to move along a ramp whose mean line, rising towards the front of the vehicle, is disposed in a longitudinal vertical plane of this vehicle and is inclined with respect to the longitudinal axis thereof by an acute angle A substantially such that $A = \text{Arctan}([m/M]\text{tg }\alpha)$, in which formula M is the total unladen mass of the vehicle, m the unladen mass applied to the axle braked by the speed reducer and tg α the coefficient of adhesion between the wheels of said axle and the ground.

2. A control device according to claim 1, wherein angle A is between 5° and 15°.

3. A control device according to any one of claim 1, wherein means are provided for selectively adjusting angle A depending in particular on the load of the vehicle and/or the condition of the ground.

4. A control device according to claim 1, 2 or 3, wherein the mass is formed by a drop of mercury enclosed in an inclined tube forming the ramp.

5. A control device according to claim 4, wherein the base of the inclined tube is equipped with two electrical contacts which are permanently connected to an electric circuit controlling the energization of the speed reducer and which are adapted to be electrically connected together by the drop of mercury only when the deceleration of the vehicle remains less than the predetermined threshold.

6. A control device according to claim 1, 2 or 3, wherein the mass is formed by a ball.

* * * * *